United States Patent
Hsu et al.

(10) Patent No.: US 12,421,347 B2
(45) Date of Patent: Sep. 23, 2025

(54) MANUFACTURING METHOD OF ZWITTERIONIC RESIN

(71) Applicant: TAIWAN TEXTILE RESEARCH INSTITUTE, New Taipei (TW)

(72) Inventors: Chen-Shou Hsu, New Taipei (TW); Sun-Wen Juan, New Taipei (TW); Chun-Hung Lin, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 0 days.

(21) Appl. No.: 18/678,367

(22) Filed: May 30, 2024

(65) Prior Publication Data

US 2024/0317926 A1    Sep. 26, 2024

Related U.S. Application Data

(62) Division of application No. 17/856,136, filed on Jul. 1, 2022, now Pat. No. 12,043,696.

(30) Foreign Application Priority Data

Dec. 7, 2021    (TW) .................................. 110145708

(51) Int. Cl.
  *C08G 18/32*    (2006.01)
  *C08G 18/10*    (2006.01)
  *C08G 18/79*    (2006.01)
  *D06M 15/61*    (2006.01)
  *D06M 101/32*   (2006.01)

(52) U.S. Cl.
  CPC ........... *C08G 18/791* (2013.01); *C08G 18/10* (2013.01); *C08G 18/324* (2013.01); *C08G 18/329* (2013.01); *D06M 15/61* (2013.01); *D06M 2101/32* (2013.01); *D06M 2200/01* (2013.01)

(58) Field of Classification Search
  CPC .... C08G 18/791; C08G 18/10; C08G 18/324; C08G 18/329
  See application file for complete search history.

(56) References Cited

U.S. PATENT DOCUMENTS 6,221,997 B1 * 4/2001 Woodhouse ........... C08G 18/73
                                                528/84
11,486,088 B2    11/2022 Hsu et al.
(Continued)

FOREIGN PATENT DOCUMENTS

CN    110004717 A    7/2019
CN    108951118 B    10/2019
(Continued)

OTHER PUBLICATIONS

U.S. Appl. No. 17/567,503, filed Jan. 3, 2022.

*Primary Examiner* — Michael L Leonard
(74) *Attorney, Agent, or Firm* — McClure, Qualey & Rodack, LLP

(57) ABSTRACT

A zwitterionic resin is manufactured by a manufacturing method which includes the following steps. A first thermal process is performed on a first crosslinking agent and a choline having hydroxyl group or amino group to form a first mixture, in which the first crosslinking agent includes an isocyanate group. A second thermal process is performed on the first mixture, a second crosslinking agent, a chain extender, and an amino acid to form the zwitterionic resin, in which the chain extender includes a polyol.

7 Claims, 1 Drawing Sheet

Perform a first thermal process on a first crosslinking agent and a choline having hydroxyl group or amino group, such that a first mixture is formed — S10

Perform a second thermal process on the first mixture, a second crosslinking agent, a chain extender, and an amino acid, such that a zwitterionic resin is formed — S20

(56) References Cited

U.S. PATENT DOCUMENTS

| | | | |
|---|---|---|---|
| 2005/0238683 A1 | 10/2005 | Adhikari | |
| 2014/0248232 A1 | 9/2014 | Hong | |
| 2017/0191955 A1 | 7/2017 | Zou | |
| 2022/0010484 A1 | 1/2022 | Hsu et al. | |
| 2022/0235517 A1* | 7/2022 | Hsu | .................... D06M 13/148 |

FOREIGN PATENT DOCUMENTS

| | | | |
|---|---|---|---|
| CN | 111954733 A | 11/2020 |
| KR | 200362043 Y1 | 9/2004 |
| TW | I723914 B | 4/2021 |

* cited by examiner

Perform a first thermal process on a first crosslinking agent and a choline having hydroxyl group or amino group, such that a first mixture is formed ~S10

Perform a second thermal process on the first mixture, a second crosslinking agent, a chain extender, and an amino acid, such that a zwitterionic resin is formed ~S20

MANUFACTURING METHOD OF ZWITTERIONIC RESIN

CROSS-REFERENCE TO RELATED APPLICATION

This application is a divisional application of the U.S. application Ser. No. 17/856,136, filed Jul. 1, 2022 (now U.S. Pat. No. 12,043,696), which claims priority to Taiwan application Ser. No. 11/014,5708, filed Dec. 7, 2021, which is herein incorporated by reference.

BACKGROUND

Field of Invention

The present disclosure relates to a manufacturing method of a resin, and particularly relates to a manufacturing method of a zwitterionic resin.

Description of Related Art

People in today's society often do not have too much time and effort to clean the stained clothing due to their busy work, and sometimes the clothing are even accumulated for several days without being washed. As such, stains are easily embedded in the fibers and difficult to be removed. Therefore, there is a need for clothing with decontamination, bacteriostatic, and deodorization properties to increase the convenience of daily life. However, most of the textiles on the market are unable to maintain those properties, which will gradually degrade and finally fail to meet the users' needs as the number of wearing times increases. Therefore, how to improve and maintain the decontamination, bacteriostatic, and the deodorization property of the textiles is still an important issue for the textile industry.

SUMMARY

The present disclosure provides a zwitterionic resin which can provide good moisture-absorbing and quick-drying properties, good decontamination and bacteriostatic properties, a good deodorization property, and good washing fastness for a functional fabric manufactured therefrom.

According to some embodiments of the present disclosure, a manufacturing method of a zwitterionic resin includes the following steps. A first thermal process is performed on a first crosslinking agent and a choline having hydroxyl group or amino group, such that a first mixture is formed, in which the first crosslinking agent includes an isocyanate group. A second thermal process is performed on the first mixture, a second crosslinking agent, a chain extender, and an amino acid, such that the zwitterionic resin is formed, in which the chain extender includes a polyol.

In some embodiments of the present disclosure, the first crosslinking agent includes a chemical structure represented by formula (1),

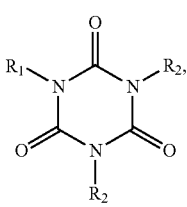

formula (1)

in which $R_1$ includes the isocyanate group, and $R_2$ includes a chemical structure represented by formula (2),

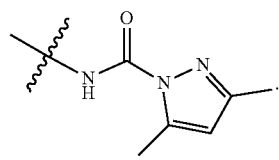

formula (2)

In some embodiments of the present disclosure, the first crosslinking agent and the second crosslinking agent are the same chemicals.

In some embodiments of the present disclosure, a reaction temperature of the first thermal process is between 80° C. and 110° C., and a reaction time of the first thermal process is between 5 minutes and 20 minutes.

In some embodiments of the present disclosure, a reaction temperature of the second thermal process is between 130° C. and 150° C., and a reaction time of the second thermal process is between 3 minutes and 5 minutes.

In some embodiments of the present disclosure, the manufacturing method of the zwitterionic resin further includes the following step. The second thermal process is performed on the first mixture, the second crosslinking agent, the chain extender, the amino acid, and a defoamer, such that the zwitterionic resin is formed, in which the defoamer includes a polyamide, a polyamide derivative, or combinations thereof.

In some embodiments of the present disclosure, the amino acid includes a tyrosine, a glutamic acid, a glutamine, an aspartic acid, or combinations thereof.

According to some embodiments of the present disclosure, a zwitterionic resin is manufactured by a manufacturing method including the following steps. A first thermal process is performed on a first crosslinking agent and a choline having hydroxyl group or amino group, such that a first mixture is formed, in which the first crosslinking agent includes an isocyanate group. A second thermal process is performed on the first mixture, a second crosslinking agent, a chain extender, and an amino acid, such that the zwitterionic resin is formed, in which the chain extender includes a polyol.

In some embodiments of the present disclosure, the choline having hydroxyl group or amino group includes a chemical structure represented by formula (3) or formula (4),

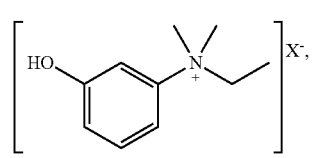

formula (3)

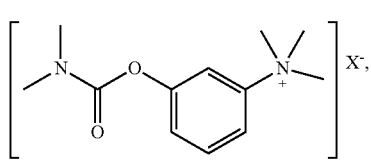

formula (4)

in which X represents Cl, OH, or a tartaric group.

In some embodiments of the present disclosure, the polyol includes a pentaerythritol.

In some embodiments of the present disclosure, a usage amount of the first crosslinking agent is between 27 parts by weight and 45 parts by weight, and a usage amount of the choline having hydroxyl group or amino group is between 2 parts by weight and 10 parts by weight.

In some embodiments of the present disclosure, a usage amount of the chain extender is between 3 parts by weight and 9 parts by weight, and a usage amount of the amino acid is between 4 parts by weight and 10 parts by weight.

In some embodiments of the present disclosure, a usage amount of the second crosslinking agent is between 3 parts by weight and 5 parts by weight.

In some embodiments of the present disclosure, the manufacturing method further includes the following step. The first mixture, the second crosslinking agent, the chain extender, and the amino acid are mixed, such that a second mixture is formed, in which a viscosity of the second mixture is between 1.5 cP and 10 cP.

In some embodiments of the present disclosure, the manufacturing method further includes the following step. The second thermal process is performed on the first mixture, the second crosslinking agent, the chain extender, the amino acid, and a defoamer, such that the zwitterionic resin is formed, in which the defoamer includes a polyamide, a polyamide derivative, or combinations thereof.

In some embodiments of the present disclosure, the manufacturing method further includes the following step. The first mixture, the second crosslinking agent, the chain extender, the amino acid, and the defoamer are mixed, such that a third mixture is formed, in which a viscosity of the third mixture is between 1.5 cP and 10 cP.

According to the aforementioned embodiments of the present disclosure, the zwitterionic resin can be firmly disposed on a base cloth to form a funtional fabric, such that the funtional fabric is provided with good moisture-absorbing and quick-drying properties, a good deodorization property, good decontamination and bacteriostatic properties, and good washing fastness. In addition, the zwitterionic resin can be disposed on the base cloth by means of dipping or inkjet coating, so as to provide multiple applications. During the manufacturing process of the zwitterionic resin, the first cross linking agent can be ensured to undergo a segmented reaction by a design of two-stage thermal process, such that the subsequently formed zwitterionic resin has a complicated network structure, which is beneficial for improving the moisture-absorbing and quick-drying properties, the deodorization property, the decontamination and bacteriostatic properties, and the washing fastness of the functional fabric. Accordingly, the functional fabric made from the zwitterionic resin can still maintain its functions well after multiple times of washing, and can be widely used in the field of functional apparel textiles.

BRIEF DESCRIPTION OF THE DRAWINGS

The disclosure can be more fully understood by reading the following detailed description of the embodiments, with reference made to the accompanying drawings as follows:

The FIGURE is a flowchart illustrating a fabricating method of a zwitterionic resin according to some embodiments of the present disclosure.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the present disclosure, the structure of a polymer or a functional group is sometimes represented by a skeleton formula. This representation can omit carbon atoms, hydrogen atoms, and carbon-hydrogen bonds. Certainly, if the atom or atom group is clearly drawn in the structural formula, the drawing shall prevail.

The present disclosure provides a zwitterionic resin which can be firmly disposed on a base cloth to form a funtional fabric, such that the funtional fabric is provided with good moisture-absorbing and quick-drying properties, a good deodorization property, good decontamination and bacteriostatic properties, and good washing fastness, thereby effectively solving the problem of poor washing fastness and short lifespan of the conventional functional fabric. In addition, the zwitterionic resin can be disposed on the base cloth by means of dipping or inkjet coating, so as to provide multiple applications.

The figure is a flowchart illustrating a manufacturing method of a zwitterionic resin according to some embodiments of the present disclosure. Reference is made to the figure. The manufacturing method of the zwitterionic resin includes steps S10 and S20. In step S10, a first thermal process is performed on a first crosslinking agent and a choline having hydroxyl group or amino group, such that a first mixture is formed. In step S20, a second thermal process is performed on the first mixture, a second crosslinking agent, a chain extender, and an amino acid, such that the zwitterionic resin is formed. The aforementioned steps will further be discussed in the following descriptions.

Firstly, a first crosslinking agent and a choline having hydroxyl group or amino group are provided. In some embodiments, the first crosslinking agent may include a chemical structure represented by formula (1),

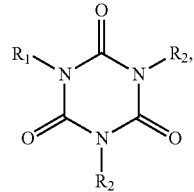

formula (1)

in which $R_1$ includes an isocyanate group, and $R_2$ includes a blocked isocyanate group. For example, the first crosslinking agent may derive from an aliphatic isocyanate such as hexamethylene diisocyanate (HDI), trimethyl hexamethylene diisocyanate (TMHDI), isophorone diisocyanate (IPDI) trimers, or combinations thereof. As another example, the first crosslinking agent may derive from an aromatic isocyanate such as xylylene diisocyanate (XDI), hydrogenated tolylene diisocyanate (HTDI), dicyclohexylmethane-4,4'-diisocyanate (HMDI), tolylene diisocyanate (TDI), diphenyl methane diisocyanate (MDI) trimers, or combinations thereof. In some embodiments, the blocked isocyanate group of the first crosslinking agent may be, for example, 3,5-dimethylpyrazole (DMP), which is a chemical structure represented by formula (2), formula (2)

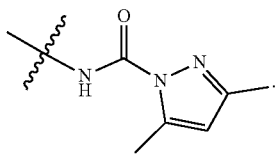

By making the first crosslinking agent include both the isocyanate group and the blocked isocyanate group, it can be ensured that the first crosslinking agent is only partially reacted during the subsequent first thermal process, thereby providing a partial reactivity for further reaction during the subsequent second thermal process. In this way, the formed zwitterionic resin can have a complex network structure, which is beneficial to improve the moisture-absorbing and quick-drying properties, the deodorization property, the decontamination and bacteriostatic properties, and the washing fastness of the functional fabric manufactured from the zwitterionic resin.

In some embodiments, the choline having hydroxyl group or amino group may be, for example, an alcohol or amine including a zwitterionic group. In some embodiments, the choline having hydroxyl group may include a chemical structure represented by formula (3), formula (3)

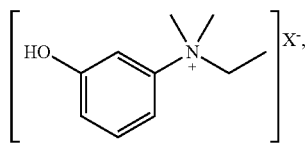

and the choline having amino group may include a chemical structure represented by formula (4), formula (4)

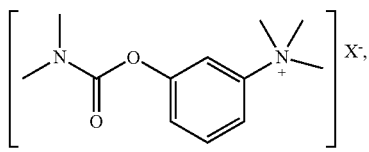

in which X may be, for example, a counterion that keeps the choline neutral, such as Cl, OH, or a tartaric group. The zwitterionic group of the choline can be preserved in the zwitterionic resin formed subsequently to provide the antistaining resin with good moisture-absorbing and quick-drying properties and good decontamination and bacteriostatic properties.

Next, step S10 is proceeded, in which the first thermal process is performed on the first crosslinking agent and the choline having hydroxyl group or amino group, such that a first mixture is formed. Specifically, the isocyanate group of the first crosslinking agent can react with the hydroxyl or amino group of the choline, such that the first mixture is formed. In some embodiments, a reaction temperature of the first thermal process can be between 80° C. and 110° C., and a reaction time of the first thermal process may be between 5 minutes and 20 minutes, so as to ensure that the reaction proceeds successfully. In some embodiments, when the first crosslinking agent is reacted with the choline having hydroxyl group, the reaction temperature of the first thermal process may be between 90° C. and 110° C., and when the first crosslinking agent is reacted with the choline having amino group, the reaction temperature of the first thermal process can be between 80° C. and 110° C. In some embodiments, a usage amount of the first crosslinking agent may be between 27 parts by weight and 45 parts by weight, and a usage amount of the choline having hydroxyl group or amino group may be between 2 parts by weight and 10 parts by weight, thereby facilitating the each choline having hydroxyl group or amino group to react with the isocyanate group of the first crosslinking agent.

Subsequently, a second crosslinking agent, a chain extender, and an amino acid are provided. In some embodiments, the second crosslinking agent may include an isocyanate trimer. Specifically, the second crosslinking agent may include the aforementioned chemical structure represented by formula (1), in whic $R_1$ may include an isocyanate group, and $R_2$ may include a blocked isocyanate group. For example, the second crosslinking agent may derive from an aliphatic isocyanate such as hexamethylene diisocyanate (HDI), trimethyl hexamethylene diisocyanate (TMHDI), isophorone diisocyanate (IPDI) trimers, or combinations thereof. As another example, the second crosslinking agent may derive from an aromatic isocyanate such as xylylene diisocyanate (XDI), hydrogenated tolylene diisocyanate (HTDI), dicyclohexylmethane-4,4'-diisocyanate (HMDI), tolylene diisocyanate (TDI), diphenyl methane diisocyanate (MDI) trimers, or combinations thereof. In some embodiments, the blocked isocyanate group of the second crosslinking agent may be, for example, 3,5-dimethylpyrazole (DMP), which is the afornemented chemical structure represented by formula (2). In some embodiments, the second crosslinking agent and the first crosslinking agent may be the same chemicals, such that the reaction can be simplified, thereby improving the reactivity of each reagent during the second thermal process. In some embodiments, in the second crosslinking agent represented by the aforementioned formula (1), $R_1$ and $R_2$ may both include the isocyanate group (i.e., the second crosslinking agent may not include the blocked isocyanate group), thereby ensuring that the second crosslinking agent is fully reacted during the subsequent second thermal process. The second crosslinking agent can increase the chemical structure length and crosslinking degree of the zwitterionic resin in the subsequent second thermal process, such that the zwitterionic resin can be more firmly disposed on the base cloth, thereby improving the moisture-absorbing and quick-drying properties, the deodorization property, the decontamination and bacteriostatic properties, and the washing fastness of the functional fabric manufactured from the zwitterionic resin.

The chain extender includes a polyol. In some embodiments, the polyol may be, for example, ethylene glycol, propylene glycol, 1,3-butanediol, 1,4-butanediol, pentanediol, hexanediol, octanediol, triethylene glycol, tetraethylene glycol, glycerol, trimethylolmethane, trimethylolethane, xylitol, sorbitol, sucrose, pentaerythritol, or combinations thereof. In some preferred embodiments, the polyol may be, for example, pentaerythritol. Similar to the role of the second crosslinking agent, the chain extender can increase the chemical structure length and crosslinking degree of the zwitterionic resin in the subsequent second thermal process, such that the zwitterionic resin can be more firmly disposed on the base cloth, thereby improving the moisture-absorbing and quick-drying properties, the deodorization property, the decontamination and bacteriostatic properties, and the washing fastness of the functional fabric manufactured from the zwitterionic resin.

In some embodiments, the amino acid may be, for example, tyrosine, glutamic acid, glutamine, aspartic acid, or combinations thereof. The amino group and/or the carboxyl group of the amino acid can be retained in the subsequently formed zwitterionic resin, thereby providing the zwitterionic resin with a good deodorization property. In some preferred embodiments, the amino acid may be, for example, aspartic acid.

Then, the first mixture, the second crosslinking agent, the chain extender, and the amino acid are mixed, such that a second mixture is formed.

In some embodiments, when a usage amount of the first crosslinking agent is between 27 parts by weight and 45 parts by weight, a usage amount of the second crosslinking agent may be between 3 parts by weight and 5 parts by weight, a usage amount of the chain extender may be between 3 parts by weight and 9 parts by weight, and a usage amount of the amino acid may be between 4 parts by weight and 10 parts by weight, such that the crosslinking degree between the ingredients is improved. In some embodiments, the second mixture may be adapted to be formed on tasurface of the base cloth by means of dipping, so as to form the zwitterionic resin disposed on the base cloth during the subsequent second thermal process. In some embodiments, a viscosity of the second mixture may be between 1.5 cP and 10 cP, thereby facilitating the dipping of the base cloth.

In some embodiments, 0.01 parts by weight to 0.05 parts by weight of a defoamer, 0.05 parts by weight to 0.1 parts by weight of a surfactant and/or 40 parts by weight to 350 parts by weight of water may be further added to the second mixture, such that a third mixture is formed, in which the third mixture can be adapted to be formed on the surface of the base cloth by means of inkjet coating, so as to form a zwitterionic resin disposed on the base cloth during the subsequent second thermal process. That is, the third mixture can also be regarded as ink. The defoamer falling within the above ratio ranges can ensure that the third mixture is free of foam and can help to bring the viscosity and surface tension of the third mixture into suitable ranges; while the surfactant falling within the above ratio ranges can provide the third mixture with good dynamic stability to facilitate spraying. In some embodiments, the defoamer may include polyether-modified polydimethylsiloxanes, foam-breaking polysiloxanes, mixtures of foam-breaking polysiloxanes and hydrophobic particles dissolved in polyethylene glycol, polyamides, polyamide derivatives, or combinations thereof; and the surfactant may include polydimethylsiloxane, polyether-modified siloxane, polyether-modified polydimethylsiloxane, or combinations thereof. In some embodiments, a viscosity of the third mixture may be between 1.5 cP and 10 cP, such that the ink droplets printed can have a suitable size, and the ink can have suitable fluidity to facilitate inkjet coating.

Subsequently, the second mixture or the third mixture is disposed on the base cloth in its appropriate manner. For the second mixture, the base cloth can be dipped in the second mixture, such that the second mixture covers the base cloth and penetrates into the base cloth. In more detail, when the base cloth is dipped in the second mixture, each ingredient in the second mixture can be attached to the surface of each fiber or yarn and cover each yarn. In some embodiments, the base cloth after dipping can be pressed and by a double-roller to remove the excess second mixture on the surface of the base cloth. For the third mixture, the third mixture can be placed into an inkjet coating machine, such that the third mixture can be disposed on the surface of the base cloth by means of inkjet coating. In more detail, when the third mixture is sprayed on the surface of the base cloth, each ingrediant in the third mixture can be attached to the whole or a portion of the surface of each fiber or yarn. In some embodiments, the base cloth may include a knitted fabric, a woven fabric, a non-woven fabric, etc. In some embodiments, the base material of the base cloth can be, for example, polyethylene terephthalate, so as to prevent the base cloth from chemically reacting with the ingrediant in the second mixture or the third mixture during the subsequent thermal process.

Next, step S20 is proceeded, in which the second thermal process is performed on the second mixture (including the first mixture, the second crosslinking agent, the chain extender, and the amino acid) or the third mixture (including the first mixture, the second crosslinking agent, the chain extender, the amino acid, and the defoamer, surfactant or water) disposed on the base cloth, such that the zwitterionic resin and the functional fabric are formed. In detail, during the second thermal process, the ingredients in the second mixture or the third mixture attached to the surface of the yarn can react with each other to crosslink with each other, so as to form the zwitterionic resin, and the zwitterionic resin can be firmly disposed on the base cloth to form the functional fabric. For example, during the second thermal process, the second crosslinking agent and the unreacted first crosslinking agent over the first thermal process can respectively undergo a crosslinking reaction. As another example, the chain extender and the amino acid can also undergo a crosslinking reaction during the second thermal process. In some embodiments, a reaction temperature of the second thermal process may be between 130° C. and 150° C., and a reaction time of the second thermal process may be between 3 minutes and 5 minutes, so as to meet the requirements of the post-treatment of the industry.

In some embodiments, the base cloth of the functional fabric has at least two layers. Specifically, the interlayers of the base cloth may be three-dimensional spaces naturally formed by yarns or fibers after being interwoven or stacked, and the yarns or fibers may be interwoven or entangled between the two layers of the base cloth. For example, when the base cloth of the functional fabric is a woven fabric, the interlayers of the base cloth may be three-dimensional spaces formed by the warp yarns separated by the weft yarns. As another example, when the base cloth of the functional fabric is a knitted fabric, the interlayers of the base cloth may be three-dimensional spaces formed by the knitted loops from the interlaced yarns. As further examples, when the base cloth of the functional fabric is a non-woven fabric, the interlayers of the base cloth may be gaps formed by the stacked yarns (or fibers). In some embodiments, the zwitterionic resin is disposed between the two layers of the base cloth to be firmly disposed on the base cloth. In this regard, the functional fabric can also completely covers each yarn or fiber of the base cloth, so as to be disposed between the two layers of the base cloth.

After the above steps S10 to S20 are performed, the functional fabric of the present disclosure can be obtained, and the zwitterionic resin in the functional fabric is firmly disposed on the base cloth. Since the zwitterionic resin in the functional fabric has zwitterionic groups derived from the choline, it can have a good moisture-absorbing property to achieve a quick-drying effect. In addition, since the zwitterionic resin in the functional fabric has an amino group and/or a carboxyl group derived from the amino acid, the zwitterionic resin can have a good deodorization property.

Furthermore, the zwitterionic resin formed by the two-stage thermal process can form a complex network structure on the fibers or yarns of the base cloth, such that the zwitterionic resin can be more firmly disposed on the base cloth. Accordingly, the formed functional fabric can be ensured to have good moisture-absorbing and quick-drying properties, a good deodorization property, good decontamination and bacteriostatic properties, and good washing fastness.

It should be particularly noted that by designing the chemical structure of the first crosslinking agent and the setting of the reaction temperature of each of the first and second thermal processes in the present disclosure, the first crosslinking agent and its derivatives produced during the thermal process can be ensured to undergo a segmented reaction. In detail, since the first crosslinking agent of the present disclosure only partially reacts at a temperature of 80° C. to 110° C., and can completely react at a temperature of 130° C. to 150° C., the reaction temperatures of the first and second thermal processes are respectively set in the above range to ensure that portions of the first crosslinking agent is preserved for a crosslinking reaction during the second thermal process. Accordingly, the subsequently formed zwitterionic resin can have a complicated network structure, which is beneficial for improving the moisture-absorbing and quick-drying properties, the deodorization property, the decontamination and bacteriostatic properties, and the washing fastness. On the other hand, by designing the chemical structure of the second crosslinking agent and the setting of the reaction temperature of the second thermal process, the second crosslinking agent is ensured to be completely reacted during the second thermal process, such that the crosslinking reaction is facilitated.

In the following descriptions, features and effects of the present disclosure will be described more specifically with reference to some embodiments and comparative examples. It is noted that without exceeding the scope of the present disclosure, the materials used, their amount and ratio, processing details, processing flow, etc. can be appropriately alternated. Therefore, the present disclosure should not be interpreted restrictively by the embodiments provided below. The ingredients used to form the zwitterionic resin and their contents in each embodiment and comparative example are shown in Table 1, in which the base cloth of each embodiment and each comparative example was a PET knitted fabric. Each embodiment is manufactured through the aforementioned steps S10 to S20, in which the reaction temperature of the first thermal process is 100° C., and the reaction temperature of the second thermal process is 130° C.

TABLE 1

| | first crosslinking agent | choline having hydroxyl group or amino group | second crosslinking agent | chain extender | amino acid |
|---|---|---|---|---|---|
| comparative example 1 | N/A | N/A | N/A | N/A | N/A |
| comparative example 2 | water-based bridging agent (27) | formula (4), $X^-$ is $Cl^-$ (2) | water-based bridging agent (3) | pentaerythritol 3 | N/A |
| comparative example 3 | water-based bridging agent (36) | formula (3), $X^-$ is $OH^-$ (10) | water-based bridging agent (4) | pentaerythritol (4) | N/A |
| embodiment 1 | water-based bridging agent (38) | formula (4), $X^-$ is $Cl^-$ (8) | water-based bridging agent (4) | pentaerythritol (8) | tyrosine (7) |
| embodiment 2 | water-based bridging agent (38) | formula (3), $X^-$ is $OH^-$ (8) | water-based bridging agent (4) | pentaerythritol (8) | tyrosine (7) |
| embodiment 3 | water-based bridging agent (40) | formula (3), $X^-$ is $OH^-$ (10) | water-based bridging agent (5) | pentaerythritol (9) | glutamine (6) |
| embodiment 4 | water-based bridging agent (39) | formula (4), $X^-$ is $OH^-$ (10) | water-based bridging agent (4) | pentaerythritol (9) | glutamine (4) |
| embodiment 5 | water-based bridging agent (37) | formula (4), $X^-$ is $OH^-$ (10) | water-based bridging agent (4) | pentaerythritol (9) | glutamic acid (5) |

TABLE 1-continued

| | first crosslinking agent | choline having hydroxyl group or amino group | second crosslinking agent | chain extender | amino acid |
|---|---|---|---|---|---|
| embodiment 6 | water-based bridging agent (45) | formula (4), $X^-$ is $OH^-$ (10) | water-based bridging agent (5) | pentaerythritol (9) | aspartic acid (10) |
| embodiment 7 | water-based bridging agent (45) | formula (4), $X^-$ is $OH^-$ (10) | water-based bridging agent (5) | pentaerythritol (9) | aspartic acid (10) |

Note 1:
The contents are shown in parentheses, and the unit of the content is parts by weight.
Note 2:
Water-based bridging agent is purchased from Taiwan Textile Research Institute.
Note 3:
Pentaerythritol is purchased from Aldrich.
Note 4:
In embodiment 7, 0.02 parts by weight of a defoamer and 120 parts by weight of water were additionally added, in which the defoamer was a polyamide derivative.
Note 5:
The zwitterionic resin in comparative examples 2 to 3 and embodiments 1 to 6 were disposed on the base cloth by dipping, and the zwitterionic resin in embodiment 7 was disposed on the base cloth by inkjet coating.

Experiment 1: Moisture-Absorbing and Quick-Drying Test and Decontamination Test for Fabrics In this experiment, the moisture-absorbing and quick-drying test for each embodiment and each comparative example was performed under the validation specification FTTS-FA-004, and the decontamination test for each embodiment and each comparative example was performed under the AATCC test method 130. Among them, embodiment 7 have further been subjected to 50 times of washing, and the tests were performed again after 50 times of washing. The results are shown in Table 2.

TABLE 2

| | number of washing (times) | moisture-absorbing and quick-drying test (grade) | decontamination test (grade) |
|---|---|---|---|
| comparative example 1 | 0 | 2 | 2-3 |
| comparative example 2 | 0 | 4 | 4-5 |
| comparative example 3 | 0 | 4 | 4 |
| embodiment 1 | 0 | 4 | 4-5 |
| embodiment 2 | 0 | 4 | 4-5 |
| embodiment 3 | 0 | 4 | 4-5 |
| embodiment 4 | 0 | 4 | 4 |
| embodiment 5 | 0 | 4 | 4-5 |
| embodiment 6 | 0 | 4 | 4-5 |
| embodiment 7 | 0 | 4 | 4-5 |
| | 50 | 4 | 4 |

As shown in Table 2, before washing, each embodiment shows good moisture-absorbing, quick-drying, and decontamination properties, and can be applied to various products (e.g., sportswear) that require moisture-absorbing, quick-drying, and decontamination properties. In addition, as can be seen from comparative examples 2 to 3, since the ingredients used to form the zwitterionic resins of comparative examples 2 to 3 include the choline having hydroxyl group or amino group, comparative examples 2 to 3 can still provide better moisture-absorbing, quick-drying, and decontamination properties than comparative example 1. Furthermore, the moisture-absorbing, quick-drying, and decontamination properties of embodiment 7 after 50 times of washing are still better than those of comparative example 1 before washing, showing better washing fastness, thereby successfully overcomes the problem of poor washing fastness caused by the use of conventional processing additives. It is worth noting that compared with the method of dipping, the method of inkjet coating is usually less able to firmly dispose the zwitterionic resin on the base cloth. Therefore, it can be reasonably inferred from the test results of embodiment 7 that comparative examples 2 to 3 and embodiments 1 to 6 can also have good moisture-absorbing, quick-drying, and decontamination properties after 50 times of washing.

Experiment 2: Drying Rate Test for Fabrics

In this experiment, in an environment where the ambient temperature was 20° C. and the relative humidity was 65%, a fabric sample with an area of 5×5 cm² was placed on a microbalance (the plate temperature of the microbalance is 20-22° C.), and the dry weight of the fabric sample was recorded. Then, 0.1 g of water was dropped with a precision dropper at the center of the fabric sample at a height of 1 cm from the tip of the dropper to the fabric sample. Next, the wet weight of the fabric was recorded. The experimental time was set to be 40 minutes, and the weight change of the fabric sample was every 5 minutes, such that the residual moisture rate was calculated. The results are shown in Table 3.

TABLE 3

| drying time (min) | comparative example | | | embodiment | | | | | | |
|---|---|---|---|---|---|---|---|---|---|---|
| | 1 | 2 | 3 | 1 | 2 | 3 | 4 | 5 | 6 | 7 |
| | residual moisture ratio (%) | | | | | | | | | |
| 0 | 100.0 | 100.0 | 100.0 | 100.0 | 100.0 | 100.0 | 100.0 | 100.0 | 100.0 | 100.0 |
| 5 | 93.7 | 89.6 | 88.7 | 90.2 | 89.8 | 89.9 | 88.9 | 90.0 | 89.7 | 89.9 |
| 10 | 87.4 | 79.3 | 78.2 | 80.1 | 79.5 | 79.6 | 78.9 | 79.6 | 78.8 | 79.5 |
| 15 | 79.6 | 68.5 | 69.1 | 68.8 | 68.8 | 68.3 | 69.2 | 69.6 | 68.6 | 69.0 |
| 20 | 71.4 | 58.2 | 58.4 | 59.3 | 68.7 | 58.6 | 58.7 | 58.6 | 58.4 | 58.8 |
| 25 | 63.3 | 48.5 | 48.6 | 48.6 | 48.3 | 49.1 | 49.0 | 48.7 | 48.1 | 49.1 |
| 30 | 54.8 | 39.2 | 39.1 | 38.8 | 38.6 | 38.7 | 39.4 | 39.1 | 38.5 | 39.4 |
| 35 | 47.3 | 29.1 | 29.5 | 29.3 | 30.1 | 30.0 | 29.7 | 29.6 | 29.4 | 30.2 |
| 40 | 39.0 | 20.1 | 21.0 | 19.8 | 20.2 | 21.1 | 20.6 | 20.5 | 19.9 | 21.7 |

As shown in Table 3, comparative example 2 to 3 and each embodiments had significantly lower residual moisture ratio than comparative example 1 after experiencing the same drying time, indicating that the choline having hydroxyl group or amino group can provide good moisture-absorbing and drying properties.

Experiment 3: Bacteriostatic Test for Fabrics

In this experiment, the bacteriostatic test of ATCC 6538 *Staphylococcus aureus* for each embodiment and each comparative example was performed under the AATCC test method 100. Among them, embodiment 7 have further been subjected to 50 times of washing, and the test was performed again after 50 times of washing. The results are shown in Table 4.

TABLE 4

| | times of washing (time) | sterilization reduction (%) |
|---|---|---|
| comparative example 1 | 0 | 0 |
| comparative example 2 | 0 | 98.5 |
| comparative example 3 | 0 | 99.3 |
| embodiment 1 | 0 | 99.9 |
| embodiment 2 | 0 | 99.7 |
| embodiment 3 | 0 | 99.9 |
| embodiment 4 | 0 | 99.9 |
| embodiment 5 | 0 | 99.9 |
| embodiment 6 | 0 | 99.9 |
| embodiment 7 | 0 | 99.9 |
| | 50 | 99.9 |

As shown in Table 4, each embodiment can achieve a sterilization reduction of greater than 97%, and embodiment 7 can still achieve a sterilization reduction of greater than 99.9% after 50 times of washing, indicating having a good bacteriostatic property and good washing fastness. On the other hand, since the ingredients used to form the zwitterionic resins of comparative examples 2 to 3 includes the choline having hydroxyl group or amino group, comparative examples 2 to 3 can still provide a good bacteriostatic property compared to comparative example 1.

Experiment 4: Deodorization Test for Fabrics

In this experiment, the deodorization test on ammonia and acetic acid for each embodiment and each comparative example was performed under the validation specification FTTS-FA-018. Among them, embodiment 7 have further been subjected to 20 times of washing, and the test was performed again after 20 times of washing. The results are shown in Table 5.

TABLE 5

| | times of washing (time) | deodorization rate (%) | |
|---|---|---|---|
| | | ammonia | acetic acid |
| comparative example 1 | 0 | 12 | 15 |
| comparative example 2 | 0 | 13 | 17 |
| comparative example 3 | 0 | 15 | 20 |
| embodiment 1 | 0 | 36 | 64 |
| embodiment 2 | 0 | 33 | 65 |
| embodiment 3 | 0 | 45 | 59 |
| embodiment 4 | 0 | 41 | 73 |
| embodiment 5 | 0 | 35 | 55 |
| embodiment 6 | 0 | 100 | 90 |
| embodiment 7 | 0 | 92 | 92 |
| | 20 | 81 | 90 |

As shown in Table 5, each embodiment has a certain degree of deodorization rate on ammonia and acetic acid. In addition, it can be seen from embodiments 6 to 7 that when aspartic acid is used as the amino acid of the present disclosure, the formed zwitterionic resin can provide a better deodorization property for the functional fabric, and can still provide a better deodorization property after 20 times of washing.

According to the aforementioned embodiments of the present disclosure, the functional fabric of the present disclosure includes the base cloth and the zwitterionic resin, and the zwitterionic resin can be firmly disposed on a base cloth, such that the funtional fabric is provided with good moisture-absorbing and quick-drying properties, a good deodorization property, good decontamination and bacteriostatic properties, and good washing fastness. In addition, the zwitterionic resin can be disposed on the base cloth by means of dipping or inkjet coating, so as to provide multiple applications. During the manufacturing process of the zwitterionic resin, the first cross linking agent can be ensured to undergo a segmented reaction by a design of two-stage thermal process, such that the subsequently formed zwitterionic resin has a complicated network structure, which is beneficial for improving the moisture-absorbing and quick-drying properties, the deodorization property, the decontamination and bacteriostatic properties, and the washing fastness of the functional fabric. Accordingly, the functional fabric of the present disclosure can still maintain its functions well after multiple times of washing, and can be widely used in the field of functional apparel textiles.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A manufacturing method of a zwitterionic resin, comprising:
performing a first thermal process on a first crosslinking agent and a choline having hydroxyl group or amino group, such that a first mixture is formed, wherein the first crosslinking agent comprises an isocyanate group, wherein the choline having hydroxyl group or amino group comprises a chemical structure represented by formula (3) or formula (4),

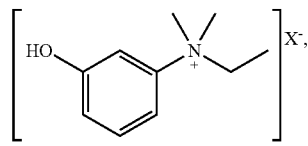

formula (3)

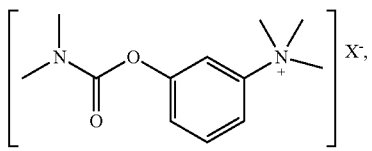

formula (4)

wherein X⁻ represents Cl⁻, OH⁻, or a tartaric group; and
performing a second thermal process on the first mixture, a second crosslinking agent, a chain extender, and an amino acid, such that the zwitterionic resin is formed, wherein the chain extender comprises a polyol.

2. The manufacturing method of the zwitterionic resin of claim 1, wherein the first crosslinking agent comprises a chemical structure represented by formula (1),

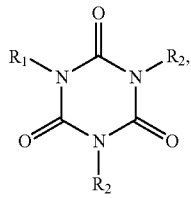

formula (1)

wherein $R_1$ comprises the isocyanate group, and $R_2$ comprises a chemical structure represented by formula (2),

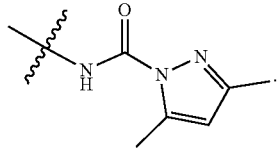

formula (2)

3. The manufacturing method of the zwitterionic resin of claim 1, wherein the first crosslinking agent and the second crosslinking agent are the same chemicals.

4. The manufacturing method of the zwitterionic resin of claim 1, wherein a reaction temperature of the first thermal process is between 80° C. and 110° C., and a reaction time of the first thermal process is between 5 minutes and 20 minutes.

5. The manufacturing method of the zwitterionic resin of claim 1, wherein a reaction temperature of the second thermal process is between 130° C. and 150° C., and a reaction time of the second thermal process is between 3 minutes and 5 minutes.

6. The manufacturing method of the zwitterionic resin of claim 1, futher comprises:
performing the second thermal process on the first mixture, the second crosslinking agent, the chain extender, the amino acid, and a defoamer, such that the zwitterionic resin is formed, wherein the defoamer comprises a polyamide, a polyamide derivative, or combinations thereof.

7. The manufacturing method of the zwitterionic resin of claim 1, wherein the amino acid comprises a tyrosine, a glutamic acid, a glutamine, an aspartic acid, or combinations thereof.

* * * * *